Patented May 3, 1927.

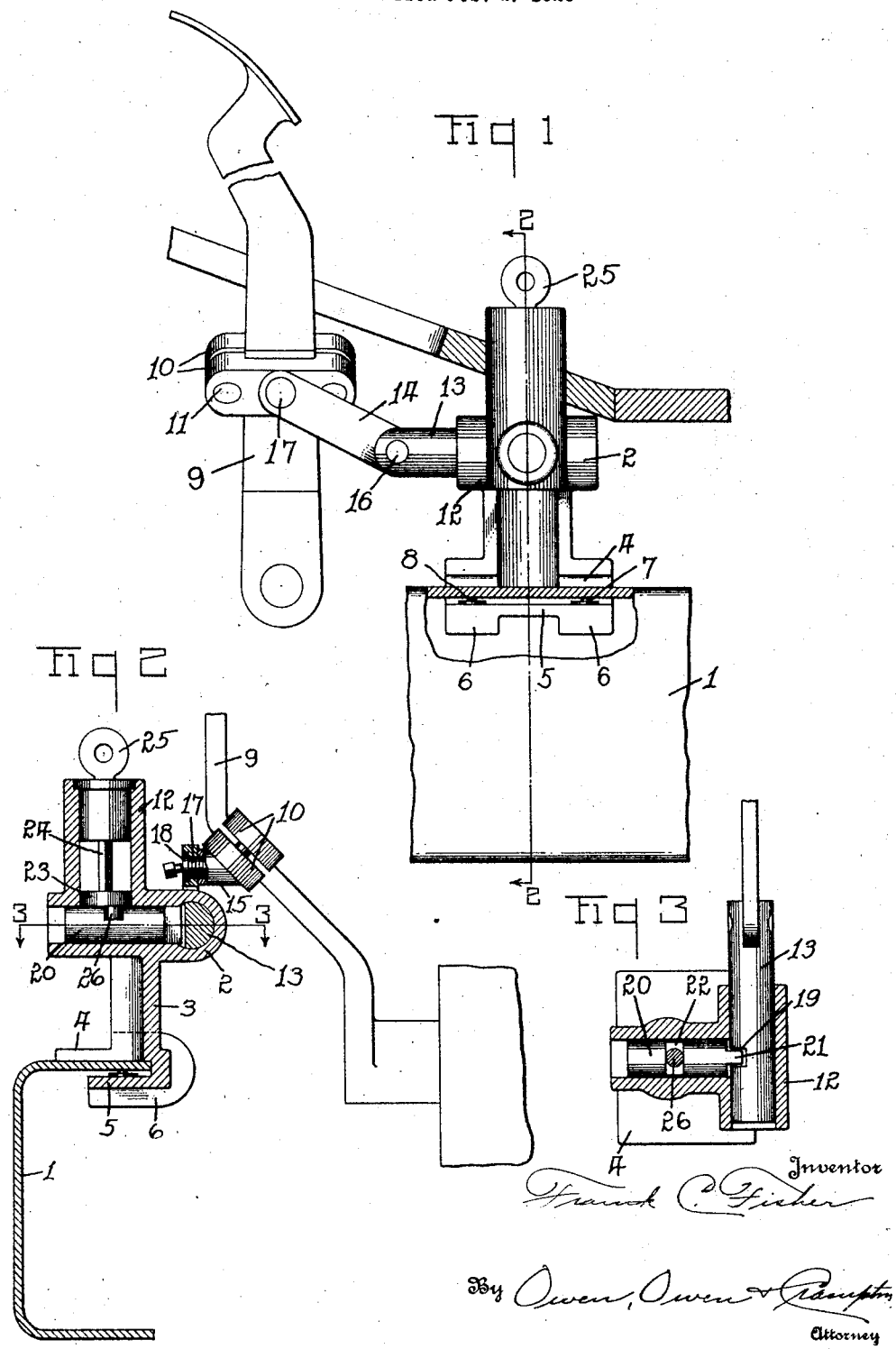

1,627,082

UNITED STATES PATENT OFFICE.

FRANK C. FISHER, OF TOLEDO, OHIO, ASSIGNOR TO THE BRYAN SCREW MACHINE PRODUCTS COMPANY, OF BRYAN, OHIO, A CORPORATION OF OHIO.

AUTOMOBILE LOCK.

Application filed February 2, 1925. Serial No. 6,280.

My invention has for its object to provide a means for locking an automobile control lever such as a gear shift lever or pedal lever that may be readily connected to some fixed part of the machine, such as, the chassis frame of the automobile, and also fixedly secured to the lever, a part of the said means interconnecting the lever and the fixed part of the machine being so constructed that it may freely move with reference to one or both of the connecting parts, or may be locked in a fixed position to prevent movement of the lever with reference to the fixed part of the machine, such as, the chassis frame. In the preferred embodiments of my invention the locking means is securely attached to one of the side bars of the chassis frame and to a speed gear shift lever such as the forward speed changing pedal lever of the well known Ford automobile, the parts of the locking means being slidable, one relative to the other, and a key actuated lock, connected to one of the relatively movable parts, may be operated to inter-lock the said parts to prevent the said relative movements. This will lock the lever, such as, the pedal lever in a preferred position such as a position that will prevent moving of the automobile in a forward direction. The same structure may be applied to the reverse pedal lever, which when locked in a forward position will cause the car to move backward, except as it may be overcome by the forward controlling clutch that may be actuated by the forward speed lever. Preferably the locking means is connected to the forward speed lever and so as to hold the forward speed lever in its neutral position when the said relatively movable parts are locked together.

The invention may be contained in structures which in their details vary from each other. To illustrate a practical application of the invention I have selected a structure containing the invention as an example of such structures, and shall describe it hereinafter. The structure selected is shown in the accompanying drawing.

Figure 1 of the drawing illustrates a side view of the automobile lock and parts of the automobile to which the lock is connected. Fig. 2 is a view of a section taken on the plane of the line 2—2 indicated in Fig. 1. Fig. 3 is a view of a section taken on the plane of the line 3—3 as indicated in Fig. 2.

The automobile lock illustrated in the drawing is connected to the side bar 1 of the frame of the chassis of the automobile, it being provided with a frame 2 having a protruding part 3, that may be clamped in position on one of the sides of the channel bar of which the side bars of the frame of the chassis is formed. The protruding part 3 is provided with lips 4 and 5, between which the upper side of the channel bar of the frame is located. The lip 5 is provided with a pair of bosses 6 that reinforce the lip 5 and a pair of screws 7, having hardened points 8, are forced into the metal of the side bar 1 so as to securely key and hold the frame in position and prevent the lips 4 and 5 from being slid from their positions on opposite sides of the side bar. The screws 7 may be provided with weakened portions so that when the points 8 have been forced to puncture the metal of the side bar the portion of the screw that is provided with a suitable tool engaging head may be twisted from the body of the screw in each case. The weakened part of the screw is preferably located in such a position that it will break off within the bosses 6 of the frame 2.

The locking means is also fixedly connected to the pedal lever 9, it being provided with a pair of clamping members 10 that may be connected together by means of rivets 11 or other suitable connecting means for securely locking the clamping members, so that the clamping members cannot be removed except by the use of special tools.

The clamping members 10 are connected to the frame 2 by parts that move relative to the frame 2. The frame 2 has a shell 12 in which is located a longitudinally slidable bar 13 that is connected at one end to the clamping members 10 by means of a link 14. One of the clamping members 10 has a boss 15 that is so shaped and positioned on the said clamping member 10 as to place the link 14 in proper operative alignment with the bar 13 to cause sliding movements of the bar 13 within the shell 12. The link 14 is pivotally connected to the bar 13 by any suitable permanent connecting means, that is, one that cannot be readily severed or removed except by special tools, such as the rivet 16, and to the boss 15 by means of the screw 17 which is threaded into the boss and is provided with a flange 18 that is located in a rabbeted recess formed in the end of the link 14. The screw 17 is threaded into the boss 15 until it engages the bottom of the tapped hole formed therefor and at the same time positioning the flange 18 within the end of the link. The screw 17 is provided with a weakened portion located intermediate its head, or its tool engaging part, and the flanged portion of the screw, preferably so that upon continued rotation of the screw after it has reached the limit of its forward movement produced by its rotation, it will break at the flanged part of the screw and thus the head and the entire tool engaging part will be severed therefrom and so that the screw cannot be unscrewed from its pivot connecting relation between the end of the link 14 and one of the clamping members 10. If desired such screws may be used in place of the rivets 11 and 16 to securely connect the clamping members 10 together and the bar 13 and the end of the link 14. When, therefore, the lever 9 is moved the bar 13 will slide within the shell 12 except when it is locked in position.

The shell 12 is provided with means for locking the bar 13 in such a position as to hold the lever 9 in a non-control relation to the actuating parts of the engine, such as to hold the pedal lever 9 in its neutral position. The bar 13 is provided with a slot 19 and the shell 12 is provided with a locking bolt 20, that is movable in a part of the shell in a direction at right angles to the direction in which the bar 13 is movable. The end of the bolt 20 is provided with an engaging portion 21 which is adapted to enter the slot 19, when the pedal lever 9 has been placed in its neutral position. The bolt 20 is also provided with a slot, such as, the slot 22. The shell has a key actuated barrel to which is connected a disc 23 by any suitable means, such as, the rod 24. Thus the disc 23 may be rotated by means of the key 25. The disc 23 is provided with a pin 26 that extends into the slot 22. When, therefore, the disc 23 is rotated the pin 26 slides the bolt 20 in the shell 12. When, therefore, the bar 13 is in position such as to place the slot 19 in alignment with the engaging lug or portion 21, the bar 13 may be locked in position by rotation of the key 25 so as to locate the lug or engaging portion 21 within the slot 19. When this occurs the lever 9 will be located in the position which so places the bar 13, that it will be engaged by the bolt 20.

I claim:—

In a lock for an automobile having a speed controlling pedal lever, a frame fixedly connected to the side bar of the chassis frame of the automobile, a key rotatable barrel member, the barrel member having a pin projecting therefrom, a lock bolt having a slot into which the pin projects and slidably mounted in the first named frame and operated by the member, a slide bar located in the frame, a link for connecting the slide bar to the lever, the said bar having a recess for receiving the bolt when it is operated by the barrel member to lock the lever in a definite position.

In testimony whereof I have hereunto signed my name to this specification.

FRANK C. FISHER.